(12) United States Patent
Kupratis et al.

(10) Patent No.: US 10,502,163 B2
(45) Date of Patent: *Dec. 10, 2019

(54) GEARED TURBOFAN ARRANGEMENT WITH CORE SPLIT POWER RATIO

(71) Applicant: United Technologies Corporation, Hartford, CT (US)

(72) Inventors: Daniel Bernard Kupratis, Wallingford, CT (US); Frederick M. Schwarz, Glastonbury, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 1274 days.

This patent is subject to a terminal disclaimer.

(21) Appl. No.: 14/964,607

(22) Filed: Dec. 10, 2015

(65) Prior Publication Data

US 2016/0131084 A1    May 12, 2016

Related U.S. Application Data

(63) Continuation-in-part of application No. 14/177,372, filed on Feb. 11, 2014, now Pat. No. 10,267,228.
(Continued)

(51) Int. Cl.
  *F02C 1/00*    (2006.01)
  *F02K 3/06*    (2006.01)
(Continued)

(52) U.S. Cl.
  CPC ............... *F02K 3/06* (2013.01); *F02C 3/107* (2013.01); *F02C 7/36* (2013.01); *F05D 2260/20* (2013.01); *F05D 2260/40311* (2013.01); *F05D 2300/40* (2013.01); *F05D 2300/603* (2013.01); *F05D 2300/606* (2013.01); *Y02T 50/672* (2013.01); *Y02T 50/676* (2013.01)

(58) Field of Classification Search
  CPC ..................................... F02C 7/36; F02K 3/06
  See application file for complete search history.

(56) References Cited

U.S. PATENT DOCUMENTS 3,287,906 A    11/1966    McCormick
3,754,484 A    8/1973    Roberts
(Continued)

FOREIGN PATENT DOCUMENTS

GB    1516041    6/1978
GB    2041090    9/1980
(Continued)

OTHER PUBLICATIONS

Conference on Engineering and Physics: Synergy for Success 2006. Journal of Physics: Conference Series vol. 105. London, UK. Oct. 5, 2006.
(Continued)

*Primary Examiner* — Gerald L Sung
(74) *Attorney, Agent, or Firm* — Carlson, Gaskey & Olds, P.C.

(57) ABSTRACT

A gas turbine engine according to an example of the present disclosure includes, among other things, a fan section, and a compressor section including at least a first compressor section and a second compressor section. A power ratio is provided by the combination of the first compressor section and the second compressor section. A method of design a gas turbine engine is also disclosed.

30 Claims, 4 Drawing Sheets

Related U.S. Application Data

(60) Provisional application No. 61/899,464, filed on Nov. 4, 2013, provisional application No. 61/898,731, filed on Nov. 1, 2013.

(51) Int. Cl.
 *F02C 7/36* (2006.01)
 *F02C 3/107* (2006.01)

(56) References Cited

U.S. PATENT DOCUMENTS

| | | | |
|---|---|---|---|
| 3,892,358 | A | 7/1975 | Gisslen |
| 4,130,872 | A | 12/1978 | Harloff |
| 4,251,987 | A | 2/1981 | Adamson |
| 4,782,658 | A | 11/1988 | Perry |
| 4,827,712 | A | 5/1989 | Coplin |
| 4,916,894 | A | 4/1990 | Adamson et al. |
| 5,079,916 | A | 1/1992 | Johnson |
| 5,433,674 | A | 7/1995 | Sheridan et al. |
| 5,447,411 | A | 9/1995 | Curley et al. |
| 5,524,847 | A | 6/1996 | Brodell et al. |
| 5,778,659 | A | 7/1998 | Duesler et al. |
| 5,809,772 | A | 9/1998 | Giffin, III et al. |
| 5,857,836 | A | 1/1999 | Stickler et al. |
| 5,915,917 | A | 6/1999 | Eveker et al. |
| 5,975,841 | A | 11/1999 | Lindemuth et al. |
| 6,223,616 | B1 | 5/2001 | Sheridan |
| 6,318,070 | B1 | 11/2001 | Rey et al. |
| 6,814,541 | B2 | 11/2004 | Evans et al. |
| 6,895,741 | B2 | 5/2005 | Rago et al. |
| 7,021,042 | B2 | 4/2006 | Law |
| 7,591,754 | B2 | 9/2009 | Duong et al. |
| 7,824,305 | B2 | 11/2010 | Duong et al. |
| 7,926,260 | B2 | 4/2011 | Sheridan et al. |
| 8,075,261 | B2 | 12/2011 | Merry et al. |
| 8,104,262 | B2 | 1/2012 | Marshall |
| 8,205,432 | B2 | 6/2012 | Sheridan |
| 8,257,024 | B1 | 9/2012 | Phillips et al. |
| 2004/0255590 | A1 | 12/2004 | Rago et al. |
| 2005/0241292 | A1 | 11/2005 | Taylor et al. |
| 2007/0012026 | A1 | 1/2007 | Dev |
| 2008/0149445 | A1 | 6/2008 | Kern et al. |
| 2009/0071121 | A1 | 3/2009 | Suciu et al. |
| 2009/0293445 | A1 | 12/2009 | Ress, Jr. |
| 2010/0083631 | A1 | 4/2010 | Foster et al. |
| 2010/0148396 | A1 | 6/2010 | Xie et al. |
| 2010/0219779 | A1 | 9/2010 | Bradbrook |
| 2010/0331139 | A1 | 12/2010 | McCune |
| 2011/0056208 | A1 | 3/2011 | Norris et al. |
| 2011/0083416 | A1 | 4/2011 | Scothern |
| 2013/0259653 | A1 | 10/2013 | Schwarz et al. |
| 2013/0287545 | A1 | 10/2013 | Suciu et al. |

FOREIGN PATENT DOCUMENTS

| | | |
|---|---|---|
| WO | 2007038674 | 4/2007 |
| WO | 2008045072 | 4/2008 |

OTHER PUBLICATIONS

Kurzke, J. (2009). Fundamental differences between conventional and geared turbofans. Proceedings of ASME Turbo Expo: Power for Land, Sea, and Air. 2009, Orlando, Florida.

Agarwal, B.D and Broutman, L.J. (1990). Analysis and performance of fiber composites, 2nd Edition. John Wiley & Sons, Inc. New York: New York.

Carney, K., Pereira, M. Revilock, and Matheny, P. Jet engine fan blade containment using two alternate geometries. 4th European LS-DYNA Users Conference.

Brines, G.L. (1990). The turbofan of tomorrow. Mechanical Engineering: The Journal of the American Society of Mechanical Engineers,108(8), 65-67.

Faghri, A. (1995). Heat pipe and science technology. Washington, D.C.: Taylor & Francis.

Hess, C. (1998). Pratt & Whitney develops geared turbofan. Flug Revue 43(7). Oct. 1998.

Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.

Griffiths, B. (2005). Composite fan blade containment case. Modem Machine Shop. Retrieved from: http://www.mmsonline.com/articles/composite-fan-blade-containment-case.

Hall, C.A. and Crichton, D. (2007). Engine design studies for a silent aircraft. Journal of Turbomachinery, 129, 479-487.

Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37 (20), 1821-1837.

Brennan, P.J. and Kroliczek, E.J. (1979). Heat pipe design handbook. Prepared for National Aeronautics and Space Administration by B & K Engineering, Inc. Jun. 1979.

Horikoshi, S. and Serpone, N. (2013). Introduction to nanoparticles. Microwaves in nanoparticle synthesis. Wiley-VCH Verlag GmbH & Co. KGaA.

Kerrebrock, J.L. (1977). Aircraft engines and gas turbines. Cambridge, MA: The MIT Press.

Xie, M. (2008). Intelligent engine systems: Smart case system. NASA/CR-2008-215233.

Knip, Jr., G. (1987). Analysis of an advanced technology subsonic turbofan incorporating revolutionary materials. NASA Technical Memorandum. May 1987.

Willis, W.S. (1979). Quiet clean short-haul experimental engine (QCSEE) final report. NASA/CR-159473.

Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.

Kollar, L.P. and Springer, G.S. (2003). Mechanics of composite structures. Cambridge, UK: Cambridge University Press.

Ramsden, J.M. (Ed). (1978). The new European airliner. Flight International, 113(3590). Jan. 7, 1978.

Langston, L. and Faghri, A. Heat pipe turbine vane cooling. Prepared for Advanced Turbine Systems Annual Program Review. Morgantown, West Virginia. Oct. 17-19, 1995.

Oates, G.C. (Ed). (1989). Aircraft propulsion systems and technology and design. Washington, D.C.: American Institute of Aeronautics, Inc.

Lau K., Gu, C., and Hui, D. (2005). A critical review on nanotube and nanotube/nanoclay related polymer composite materials. Composites: Part B 37(2006) 425-436.

Shorter Oxford English dictionary, 6th Edition. (2007). vol. 2, N-Z. p. 1888.

Lynwander, P. (1983). Gear drive systems: Design and application. New York, New York: Marcel Dekker, Inc.

Sweetman, B. and Sutton, O. (1998). Pratt & Whitney's surprise leap. Interavia Business & Technology, 53.621, p. 25.

Mattingly, J.D. (1996). Elements of gas turbine propulsion. New York, New York: McGraw-Hill, Inc.

Pyrograf-III Carbon Nanofiber. Product guide. Retrieved from: http://pyrografproducts.com/Merchant5/merchant.mvc?Screen=cp_nanofiber.

Nanocor Technical Data for Epoxy Nanocomposites using Nanomer 1.30E Nanoclay. Nnacor, Inc.

Ratna, D. (2009). Handbook of thermoset resins. Shawbury, UK: iSmithers.

Wendus, B.E., Stark, D.F., Holler, R.P., and Funkhouser, M.E. (2003). Follow-on technology requirement study for advanced subsonic transport. NASA/CR-2003-212467.

Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.

Merriam-Webster's collegiate dictionary, 11th Ed. (2009). p. 824.

(56) References Cited

OTHER PUBLICATIONS

Merriam-Webster's collegiate dictionary, 10th Ed. (2001). p. 1125-1126.
Whitaker, R. (1982). ALF 502: plugging the turbofan gap. Flight International, p. 237-241, Jan. 30, 1982.
Hughes, C. (2010). Geared turbofan technology. NASA Environmentally Responsible Aviation Project. Green Aviation Summit. NASA Ames Research Center. Sep. 8-9, 2010.
File History for U.S. Appl. No. 12/131,876.
Cusick, M. (1981). Avco Lycoming's ALF 502 high bypass fan engine. Society of Automotive Engineers, inc. Business Aircraft Meeting & Exposition. Wichita, Kansas. Apr. 7-10, 1981.
Fledderjohn, K.R. (1983). The TFE731-5: Evolution of a decade of business jet service. SAE Technical Paper Series. Business Aircraft Meeting & Exposition. Wichita, Kansas. Apr. 12-15, 1983.
Dickey, T.A. and Dobak, E.R. (1972). The evolution and development status of ALF 502 turbofan engine. National Aerospace Engineering and Manufacturing Meeting. San Diego, California. Oct. 2-5, 1972.
Gunston, B. (Ed.) (2000). Jane's aero-engines, Issue seven. Coulsdon, Surrey, UK: Jane's Information Group Limited.
Ivchenko-Progress D-436. Jane's Aero-engines, Aero-engines—Turbofan. Feb. 8, 2012.
Ivchenko-Progress AI-727M. Jane's Aero-engines, Aero-engines—Turbofan. Nov. 27, 2011.
Ivchenko-Progress D-727. Jane's Aero-engines, Aero-engines—Turbofan. Feb. 7, 2007.
Turbomeca Aubisque. Jane's Aero-engines, Aero-engines—Turbofan. Nov. 2, 2009.
Aviadvigatel D-110. Jane's Aero-engines, Aero-engines—Turbofan. Jun. 1, 2010.
Rolls-Royce M45H. Jane's Aero-engines, Aero-engines—Turbofan. Feb. 24, 2010.
Honeywell LF502. Jane's Aero-engines, Aero-engines—Turbofan. Feb. 9, 2012.
Honeywell LF507. Jane's Aero-engines, Aero-engines—Turbofan. Feb. 9, 2012.
Honeywell TFE731. Jane's Aero-engines, Aero-engines—Turbofan. Jul. 18, 2012.
The International Preliminary Report on Patentability for PCT Application No. PCT/US2014/062764, dated May 12, 2016.
NASA Conference Publication. Quiet, powered-lift propulsion. Cleveland, Ohio. Nov. 14-15, 1978.
"Civil Turbojet/Turbofan Specifications", Jet Engine Specification Database (Apr. 3, 2005).
Kandebo, S.W. (1993). Geared-turbofan engine design targets cost, complexity. Aviation Week & Space Technology, 148(8), p. 32.
Hendricks, E.S. and Tong, M.T. (2012). Performance and weight estimates for an advanced open rotor engine. NASA/TM-2012-217710.
Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883.
Zalud, T. (1998). Gears put a new spin on turbofan performance. Machine Design, 70(20), p. 104.
Machine Design article dated Nov. 5, 1998, "Gas Power Cycle—Jet Propulsion Technology, a Case Study."
Zalud, T (1998). "Gears Put a New Spin on Turbofan Performance," retrieved from MachineDesign.com. Nov. 5, 1998.
Gunston, Bill, "Jane's Aero-Engines," Issue Seven, 2000, pp. 510-512.
Hendricks, E.S. and Tong, M.T. (2012) Performance and Weight Estimates for an Advanced Open Rotor Engine. NASA/TM—2012-2177100. Sep. 2012.
Guynn, M.D. (2011). Refined Exploration of Turbofan Design Options for an Advanced Single-Aisle Transport. NASA/TM-2011-216883. Jan. 2011.
International Search Report for PCT Application No. PCT/US2014/0062764 completed Jun. 5, 2015.
European Search Report for European Patent Application No. 14880285 completed Jun. 1, 2017.

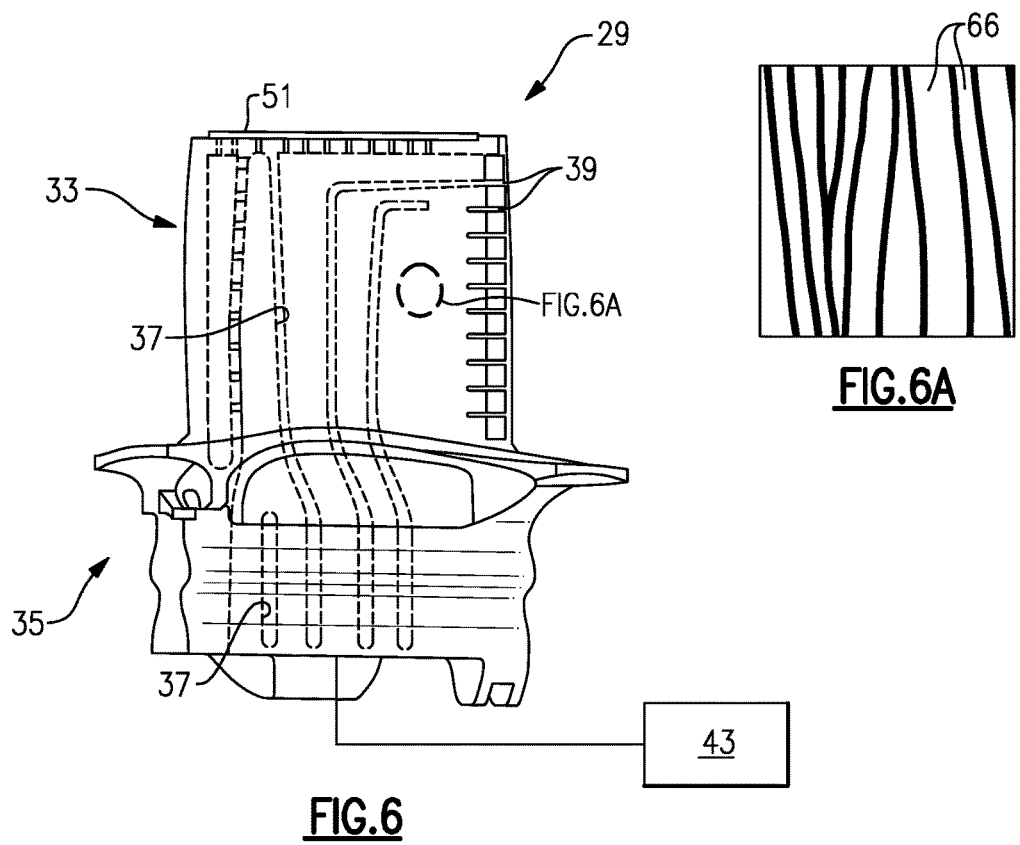
FIG. 6
FIG. 6A
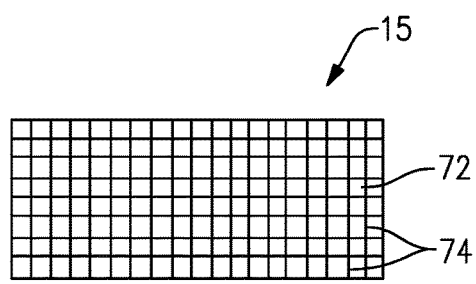
FIG. 7

GEARED TURBOFAN ARRANGEMENT WITH CORE SPLIT POWER RATIO

CROSS-REFERENCE TO RELATED APPLICATION

This application is a continuation-in-part of U.S. patent application Ser. No. 14/177,372, filed on Feb. 11, 2014, which claims priority to U.S. Provisional Application No. 61/898,731, filed on Nov. 1, 2013; and U.S. Provisional Application No. 61/899,464, filed on Nov. 4, 2013.

BACKGROUND

This application relates to a core arrangement for a gas turbine engine.

Gas turbine engines are known, and typically include a fan delivering air into a low pressure compressor section. The air is compressed in the low pressure compressor section, and passed into a high pressure compressor section. From the high pressure compressor section the air is introduced into a combustion section where it is mixed with fuel and ignited. Products of this combustion pass downstream over a high pressure turbine section, and then a low pressure turbine section.

Traditionally, the low pressure turbine section has driven both the low pressure compressor section and a fan directly. As fuel consumption improves with larger fan diameters relative to core diameters it has been the trend in the industry to increase fan diameters. However, as the fan diameter is increased, high fan blade tip speeds may result in a decrease in efficiency due to compressibility effects. Accordingly, the fan speed, and thus the speed of the low pressure compressor section and low pressure turbine section (both of which historically have been coupled to the fan via the low pressure spool), has been a design constraint.

More recently, gear reductions have been proposed between the low pressure spool (low pressure compressor section and low pressure turbine section) and the fan.

SUMMARY

A gas turbine engine according to an example of the present disclosure includes a fan section, a compressor section, including at least a first compressor section and a second compressor section, a turbine section including at least one turbine to drive the second compressor section, and a fan drive turbine to drive at least a gear arrangement to drive the fan section. The turbine section includes at least two turbine stages upstream of the fan drive turbine. A power ratio is provided by the combination of the first compressor section and the second compressor section. The power ratio is provided by a first power input to the first compressor section and a second power input to the second compressor section. The power ratio is equal to, or greater than, 1.0 and less than, or equal to, 1.4.

In a further embodiment of any of the foregoing embodiments, the power ratio is less than 1.27.

In a further embodiment of any of the foregoing embodiments, the fan drive turbine includes six or fewer stages.

In a further embodiment of any of the foregoing embodiments, the fan section is configured to deliver a portion of air into the compressor section, and a portion of air into a bypass duct, and wherein a bypass ratio, which is defined as a volume of air passing to the bypass duct compared to a volume of air passing into the compressor section, is equal to or greater than 10.

In a further embodiment of any of the foregoing embodiments, a gear ratio of the gear arrangement is greater than 2.6.

In a further embodiment of any of the foregoing embodiments, an overall pressure ratio is provided by the combination of the first compressor section, the second compressor section and a fan root pressure rise of the fan section. The overall pressure ratio is equal to or greater than 36.

In a further embodiment of any of the foregoing embodiments, the fan section defines a fan pressure ratio less than 1.50. The first turbine section is configured to rotate at least 2.6 times faster than the fan section, and an overall pressure ratio is provided by the combination of the first compressor section, the second compressor section and a fan root pressure rise of the fan section. The overall pressure ratio is equal to or greater than 36.

In a further embodiment of any of the foregoing embodiments, the first compressor section includes 3 or more stages and the second compressor section includes between 8 and 15 stages.

In a further embodiment of any of the foregoing embodiments, the fan drive turbine includes three 3 to six 6 stages.

In a further embodiment of any of the foregoing embodiments, the fan drive turbine defines a fan drive turbine pressure ratio that is greater than five.

A gas turbine engine according to an example of the present disclosure includes a fan section, and a compressor section, including at least a first compressor section and a second compressor section. The first compressor section includes 3 or more stages and the second compressor section including 6 or more stages. A turbine section includes at least one turbine to drive the second compressor section and a fan drive turbine to drive at least a gear arrangement to drive the fan section. The turbine section includes at least 2 turbine stages upstream of the fan drive turbine. A power ratio is provided by the combination of the first compressor section and the second compressor section, with the power ratio being provided by a first power input to the first compressor section and a second power input to the second compressor section. The power ratio is equal to or greater than 1.0. An overall pressure ratio is provided by the combination of the first compressor section. The second compressor section and a fan root pressure rise of the fan section. The overall pressure ratio is equal to, or greater than, 36.

In a further embodiment of any of the foregoing embodiments, the fan section defines a fan pressure ratio less than 1.50, a gear ratio of the gear arrangement is greater than 2.6, the turbine section includes at least 2 turbine stages upstream of the fan drive turbine, and the fan drive turbine includes 3 to 6 stages.

In a further embodiment of any of the foregoing embodiments, the power ratio is between 1.0 and 1.4.

In a further embodiment of any of the foregoing embodiments, the fan section defines a fan pressure ratio less than 1.45.

In a further embodiment of any of the foregoing embodiments, the fan drive turbine defines a fan drive turbine pressure ratio that is greater than five (5).

In a further embodiment of any of the foregoing embodiments, the power ratio is less than 1.27.

In a further embodiment of any of the foregoing embodiments, the fan section is configured to deliver a portion of air into the compressor section, and a portion of air into a bypass duct, and wherein a bypass ratio, which is defined as a volume of air passing to the bypass duct compared to a volume of air passing into the compressor section, is equal to or greater than 12.

A gas turbine engine according to an example of the present disclosure includes a fan section, a compressor section, including at least a first compressor section and a second compressor section, a turbine section including at least one turbine to drive the second compressor section, and a fan drive turbine to drive at least a gear arrangement to drive the fan section. A power ratio is provided by the combination of the first compressor section and the second compressor section, with the power ratio being provided by a first power input to the first compressor section and a second power input to the second compressor section. The power ratio is equal to or less than 1.4. An overall pressure ratio is provided by the combination of the first compressor section, the second compressor section and a fan root pressure rise of the fan section. The overall pressure ratio is equal to or greater than 36.

In a further embodiment of any of the foregoing embodiments, the first compressor section includes 3 or more stages. The second compressor section includes 6 or more stages. The turbine section includes at least 2 turbine stages upstream of the fan drive turbine, and the fan drive turbine includes three 3 to six 6 stages.

In a further embodiment of any of the foregoing embodiments, the power ratio is greater than or equal to 1.0.

In a further embodiment of any of the foregoing embodiments, the fan section is configured to deliver a portion of air into the compressor section, and a portion of air into a bypass duct, and wherein a bypass ratio, which is defined as a volume of air passing to the bypass duct compared to a volume of air passing into the compressor section, is equal to or greater than 10.

A method of designing a gas turbine engine according to an example of the present disclosure includes providing a fan section, providing a compressor section, including a first compressor section and a second compressor section, and providing a turbine section including at least one turbine to drive the second compressor section and a fan drive turbine to drive the fan section via a gear arrangement. A power ratio is provided by the combination of the first compressor section and the second compressor section, with the power ratio being provided by a first power input to the first compressor section and a second power input to the second compressor section. The power ratio is equal to or less than 1.4 at a predetermined design target. An overall pressure ratio is provided by the combination of the first compressor section the second compressor section and a fan root pressure rise of the fan section. The overall pressure ratio is equal to or greater than 36 at the predetermined design target.

In a further embodiment of any of the foregoing embodiments, the predetermined design target is defined at sea level and at a static, full-rated takeoff power condition.

In a further embodiment of any of the foregoing embodiments, the predetermined design target is defined at a cruise condition.

In a further embodiment of any of the foregoing embodiments, the first compressor section includes 3 or more stage. The second compressor section includes 6 or more stages. The second compressor section is positioned downstream of the first compressor section. The fan drive turbine includes three 3 to six 6 stages, and the at least one turbine includes fewer stages than the fan drive turbine.

In a further embodiment of any of the foregoing embodiments, the power ratio is greater than or equal to 1.0.

These and other features of this disclosure will be better understood upon reading the following specification and drawings, the following of which is a brief description.

BRIEF DESCRIPTION OF THE DRAWINGS

FIG. 6 illustrates a perspective view of a turbine blade.

FIG. 6A illustrates a cross-sectional view of a portion of the turbine blade of FIG. 6 having a directionally solidified microstructure.

FIG. 7 illustrates a cross-sectional view of a portion of a fan case.

DETAILED DESCRIPTION

Figure 1:
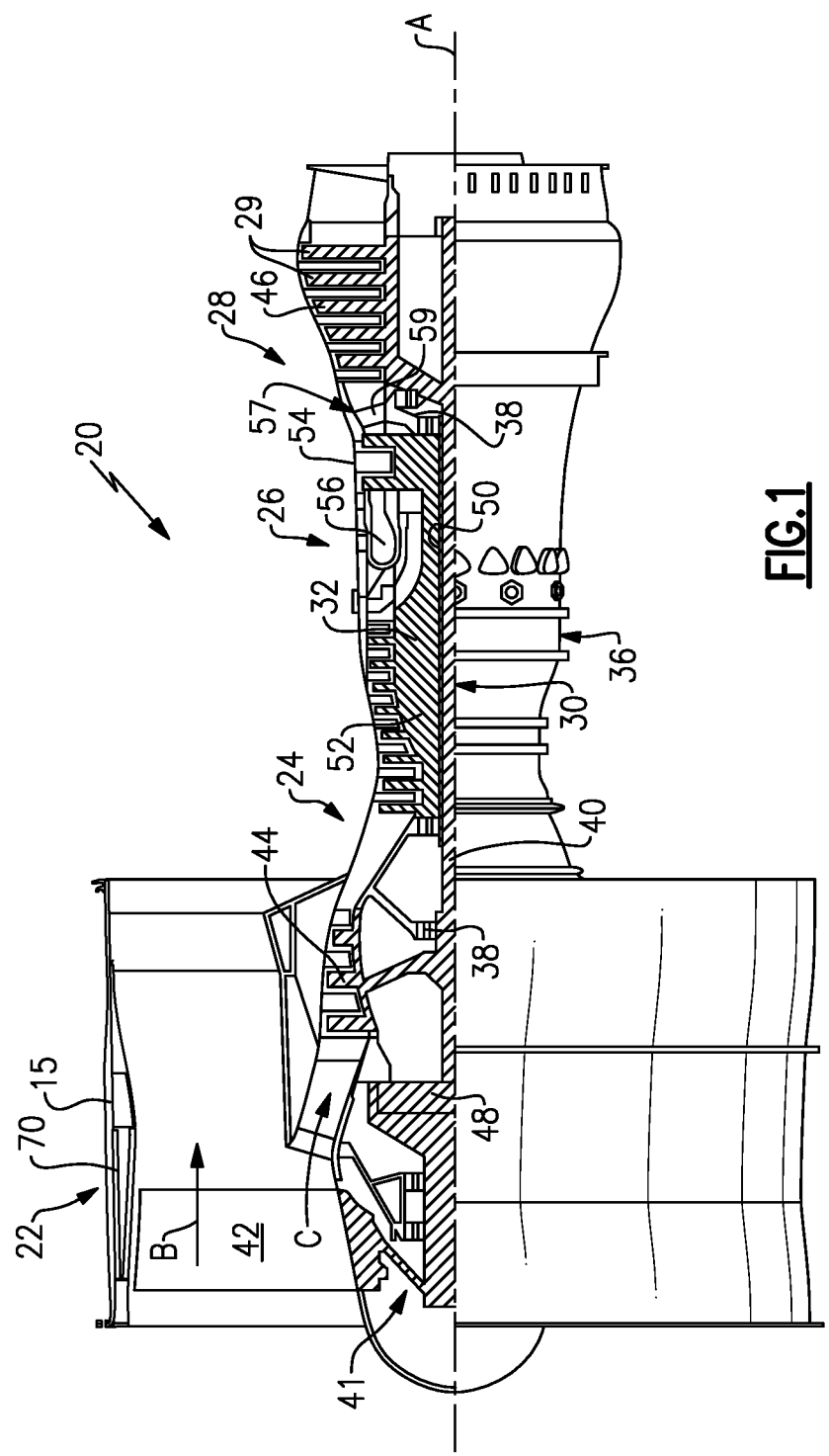
FIG. 1 shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. In some embodiments, the gear reduction ratio is less than about 5.0, or less than about 4.0. For the purposes of this disclosure, the term "about" means±3% unless otherwise indicated. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°R)]^{0.5}$. The "Low corrected fan tip speed" as disclosed herein according to one non-limiting embodiment is less than about 1150 ft/second.

Figure 2:
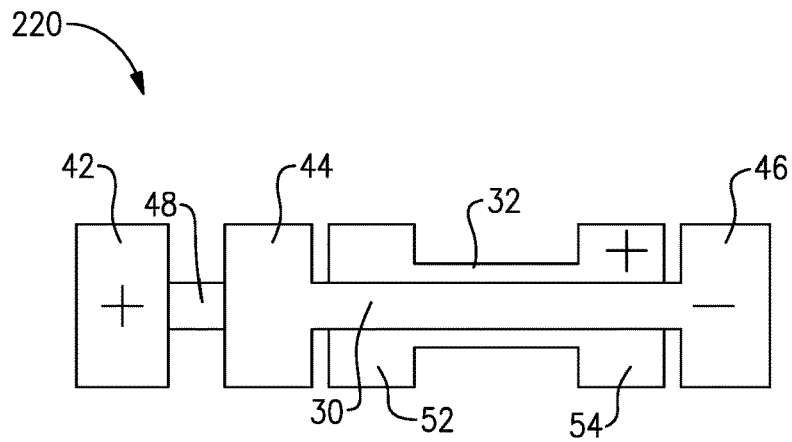
FIG. 2 schematically shows the arrangement of the low and high spool, along with the fan drive of FIG. 1.
Figure 3:
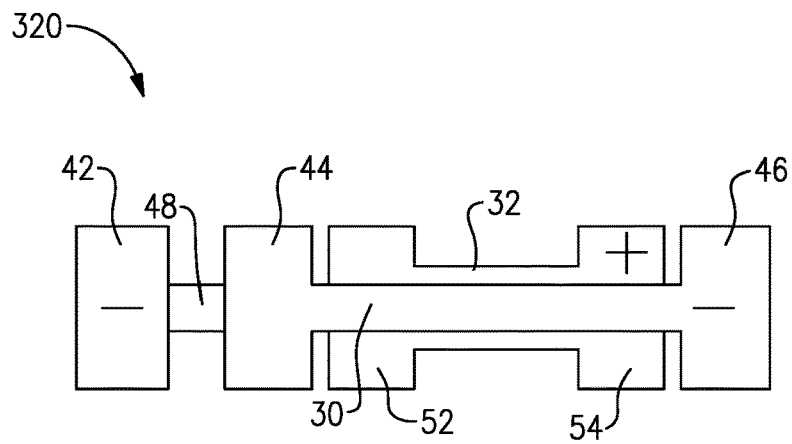
FIG. 3 schematically shows an alternative drive arrangement of FIG. 1.

FIGS. 2 and 3 schematically illustrate engines 220 and 320, each which may generally have the features of engine 20 in FIG. 1. As shown in FIG. 2, the engine 220 may be counter-rotating. This means that the low speed spool 30, including the low pressure turbine 46 and low pressure compressor 44, rotates in one direction ("−"), while the high speed spool 32, including high pressure turbine 54 and high pressure compressor 52, rotates in an opposed direction ("+"). The gear reduction 48, which may be, for example, an epicyclic transmission (e.g., with a sun, ring, and star gears), is selected such that the fan 42 rotates in the same direction ("+") as the high spool 32. In FIG. 3, the fan 42 of engine 320 rotates in the same direction as the low speed spool 30. To achieve this rotation, the gear reduction 48 may be a planetary gear reduction which would cause the fan 42 to rotate in the same direction. Of course, this application extends to engines where the two spools rotate in the same direction.

Figure 4:
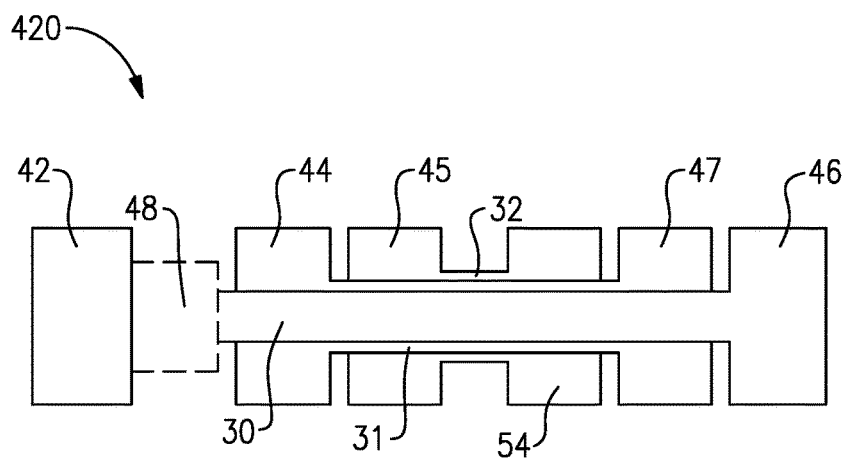
FIG. 4 schematically shows a gas turbine engine including a three-spool architecture.

FIG. 4 schematically illustrates an engine 420 arranged as a three-spool architecture. The engine includes similar features as the engine 20 and also has an intermediate spool 31. The intermediate spool 31 generally includes a low pressure compressor 44 and an intermediate pressure turbine 47 interconnected by a shaft extending along the engine central longitudinal axis A. The low speed spool 30 includes a low pressure or fan drive turbine 46 interconnected with a fan 42. In some embodiments, the engine 420 includes a gear reduction 48 positioned between the low pressure turbine 46 and the fan 42. The gear reduction 48 can be located adjacent to the fan 42 (shown) or adjacent to the low pressure turbine 46 as is known in the art. The fan 42 can be configured to rotate in the same direction or in the opposite direction as the low pressure turbine 46 via the gear reduction 48. In other embodiments, the gear reduction 48 is omitted. With the arrangement of any of the engines 20, 220, 320, 420, and with the other structure as set forth below, including the various quantities and operational ranges, the overall efficiency of the gas turbine engine is greatly increased.

Specific thrust can be used to evaluate the relative bulk of the engine. Specific thrust can be defined in one of two ways as:

$$\text{SpecificThrust} = (F_{Net})/(W_{Atotal}) \qquad \text{Equation 1:}$$

$$\text{SpecificThrust} = (1/g_c)/(V_{Jet} - V_o) \qquad \text{Equation 2:}$$

where ($F_{Net}$) is the net thrust of the engine measured in (lbf), ($W_{Atotal}$) is the total inlet air mass flow of the engine measured in (lbm per second), ($g_c$) is the gravity constant (32.174 feet×lbm per lbf per second per second), ($V_{Jet}$) is the exhaust velocity measured in (feet per second) at the exit of the engine exhaust nozzle, ($V_o$) is the flight velocity of the aircraft, and specific thrust (SpecificThrust) is measured in lbf/(lb/s). If an aircraft includes more than one engine exhaust nozzle, then ($V_{Jet}$) can be defined as the average of the exhaust velocities of the nozzles. Engines with a low specific thrust are relatively larger in size but have relatively better jet noise and fuel consumption characteristics as compared to engines with a high specific thrust.

The overall efficiency ("$\eta_{overall}$") of a gas turbine engine can be evaluated in terms of its fuel economy or TSFC defined as follows:

$$TSFC = (V_o/\eta_{overall}) \times ((3600\ \text{seconds/hr})/(J \times LHV)) \qquad \text{Equation 3:}$$

where (J) is Joule's derived energy conversion (778 ft×lbf per Btu), ($\eta_{overall}$) is the overall efficiency of the engine, and (LHV) is the fuel lower heating value measured in (Btu divided by lbm). As shown, TSFC increases as flight velocity ($V_o$) of the aircraft increases, and improvements in the overall efficiency of the engine ($\eta_{overall}$) decrease TSFC. Thus, it is desirable to improve the overall efficiency ($\eta_{overall}$) of the engine.

In this disclosure, the overall efficiency of the engine ($\eta_{overall}$) is defined as:

$$\eta_{overall} = (\eta_{propulsive} \times \eta_{thermal}) \quad \text{Equation 4:}$$

where ($\eta_{propulsive}$) is the propulsive efficiency of the engine, and where ($\eta_{thermal}$) is the thermal efficiency of the engine. In turn, thermal efficiency ($\eta_{thermal}$) and propulsive efficiency ($\eta_{propulsive}$) can be defined as:

$$\eta_{thermal} = (\text{CorePower}/\text{FuelPower}) \quad \text{Equation 5:}$$

$$\eta_{propulsive} = (\text{ThrustPower}/\text{CorePower}) \quad \text{Equation 6:}$$

where thrust power (ThrustPower) is the net thrust of the engine ($F_{NET}$) measured in (lbf multiplied by the flight velocity ($V_o$) measured in ft. per second of the aircraft), fuel power (FuelPower) is the fuel flow rate measured in (lbm/hr multiplied by the fuel lower heating value (LHV) divided by 3600 seconds per hr), and core power (CorePower) is the total power provided by the combination of the spools.

More specifically, thermal efficiency ($\theta_{Thermal}$) and propulsive efficiency ($\eta_{propulsive}$) can be defined as:

$$\eta_{thermal} = (\text{CorePower}/J)/(\dot{m}_{fuel} \times \text{LHV}/(=3600 \text{ seconds/hr})) \quad \text{Equation 7:}$$

$$\eta_{propulsive} = (V_o)[(g_c/2) \times (F_{Net}/W_{Atotal}) + V_o)] \quad \text{Equation 8:}$$

where ($\dot{m}$fuel) is the fuel flow rate to the combustor 56 measured in lbm (pounds mass) per hour.

Figure 5:
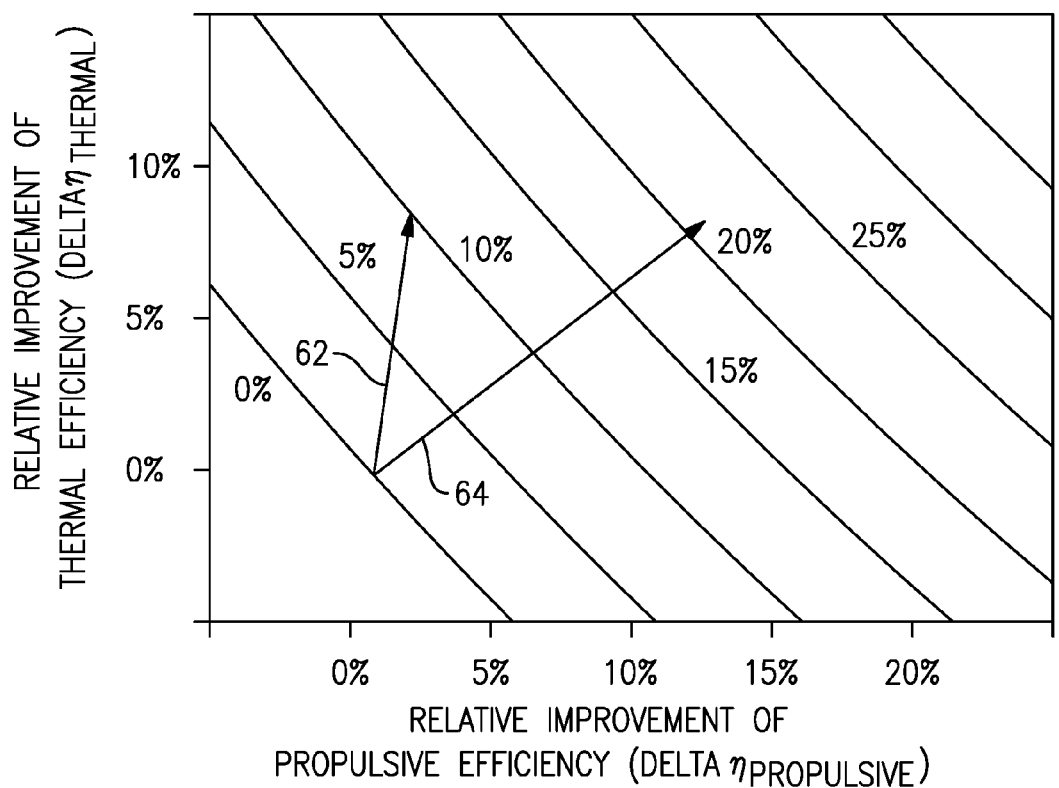
FIG. 5 graphically shows the relationship of propulsive efficiency, thermal efficiency, and overall efficiency for a gas turbine engine embodiment.

FIG. 5 graphically shows the relationship between propulsive efficiency (x-axis), thermal efficiency (y-axis), and the resultant overall efficiency (z-axis) in a gas turbine engine embodiment applying the techniques described herein as compared to prior engines. Engine designers have used various techniques to improve the fuel efficiency. Some approaches to improving fuel efficiency have included increasing the operating pressures and temperatures of the compressor section 24 and high pressure turbine 54 upstream of the fan drive turbine 46, precipitating the need for advanced materials in the turbine and compressor sections.

Vector 62 illustrates efficiency improvements typical of these approaches. Vector 62 has a slope of about 75 to 90 degrees, with an improvement in overall efficiency ($\eta_{overall}$) of about 10%, and about 3% to 0% higher propulsive efficiency ($\eta_{propulsive}$), respectively. Accordingly, these approaches have generally resulted in improvements to the thermal efficiency ($\eta_{thermal}$) but with marginal improvements to propulsive efficiency ($\eta_{propulsive}$) of the engine as a byproduct. Rather, vector 62 demonstrates that prior designers have not been concerned with selecting techniques that consider improvements in thermal efficiency ($\eta_{thermal}$) and propulsive efficiency ($\eta_{propulsive}$) simultaneously. Approaches to improving propulsive efficiency ($\eta_{propulsive}$) have included increasing the bypass ratio (BPR) of the fan section 22, which increases the size and weight of the engine.

Similarly, these approaches to improving propulsive efficiency ($\eta_{propulsive}$) have resulted in marginal improvements to overall efficiency ($\eta_{overall}$). However, the overall efficiency ($\eta_{overall}$) or thrust specific fuel consumption (TSFC) of the engine can be improved by defining an engine architecture that affects propulsive efficiency ($\eta_{propulsive}$) and thermal efficiency ($\eta_{thermal}$) simultaneously, via core power (CorePower).

One embodiment of the engine disclosed herein is illustrated as vector 64. As shown, vector 64 has a slope of about 30 to 60 degrees, which results in an improvement in the overall efficiency ($\eta_{overall}$) of the engine of about 20%, and about 14% to 8% higher propulsive efficiency ($\eta_{propulsive}$), respectively, than prior engines illustrated by vector 62.

The core power (CorePower) of a gas turbine engine can be defined as:

$$\text{CorePower} = (2 \times P_{High})/(1 + (P_{High}/P_{Low})) \quad \text{Equation 9:}$$

where ($P_{High}$) is the horsepower provided by the high speed spool 32 in a two-spool architecture, or the power provided by the high spool 32 and the intermediate spool 31 in a three-spool architecture; and where ($P_{Low}$) is the horsepower provided by the low spool 30.

A core split power ratio of the high spool ($P_{High}$) (and intermediate spool in a three-spool architecture) and the low spool ($P_{Low}$) can be defined as:

$$(P_{High}/P_{Low}) = [((2 \times \text{HP}_{HPC} \times \eta_{propulsive})(F_{Net} \times V_o)) - 1] \quad \text{Equation 10:}$$

where ($\text{HP}_{HPC}$) is the horsepower at the (second) high pressure compressor 52 (and intermediate spool in a three-spool architecture). The core split power ratio is greater than 1.0 except when concurrently: 1) the number of stages of the high pressure compressor 52 is less than the number of stages of the low pressure compressor 44; and 2) the number of stages of the high pressure compressor 52 is less than the sum of the number of stages of the high pressure turbine 54 and the number of stages of the low pressure turbine 46. As illustrated by equation 10, the overall efficiency ($\eta_{overall}$) of the engine can be improved by transferring power output from the high spool 32 to the low spool 30. However, prior engine designs have avoided this approach because it imposes undesirable thermal and mechanical stresses on the fan drive turbine 46 based on an increase in power output to drive the fan 42.

In one embodiment made according to the above design, the net thrust ($F_{Net}$) of the engine is 4,650 lbs, the flight velocity ($V_o$) is 779 ft/sec, the propulsive efficiency ($\eta_{propulsive}$) is 0.71, and the power of the high pressure compressor 52 ($\text{HP}_{HPC}$) is 10,500 hp. Thus, using Equation 10 above, the core power ratio is:

$$\text{Ratio} = (P_{High}/P_{Low}) = [((2 \times \text{HP}_{HPC} \times \eta_{propulsive})/(F_{Net} \times V_o)) - 1] = [((2 \times 10500 \times 550 \times 0.71)/(4650 \times 779)) - 1] = 1.26$$

where 1 unit of horsepower is equivalent to 550 ft-lbf/sec. In another embodiment, the ratio was about 1.2. In a further embodiment, the ratio was about 0.8. With ratios in the 0.5 to 1.4 range, and with a propulsive efficiency equal to or greater than about 0.65, a very efficient overall gas turbine engine is achieved. More narrowly, ratios equal to or greater than about 0.71 are more efficient. Ratios in the 0.77 to 1.3 range are even more efficient. Even more narrowly, ratios in the 0.9 to 1.1 range are more efficient. In a further embodiment, the ratio was about 1.0, with the horsepower at the each of the low and high spools 30, 32 being approximately equivalent. As a result of these ratios, in particular, the compressor section and turbine section can be made much smaller than in the prior art, both in diameter and axial length. In addition, the efficiency of the overall engine is greatly increased.

The overall efficiency of the disclosed gas turbine engine is much higher than in the prior art. The exemplary gas turbine engine A (described above) and exemplary gas turbine engine B are compared to a direct-drive comparison engine C and a direct-drive base comparison engine D, and can be found in Table 1 as follows:

TABLE 1

|  | Engine A | Engine B | Comp. Engine C | Base Engine D |
|---|---|---|---|---|
| Net Thrust (FNet) (lbs) | 4650 | 3925 | 4880 | 14158 |
| Flight Velocity (Vo) (ft/sec) | 779 | 779 | 779 | 828 |
| Propulsive Efficiency ($\eta_{propulsive}$) | 0.71 | 0.71 | 0.67 | 0.65 |
| Power, High Pressure Compressor ($HP_{HPC}$) | 10500 | 8950 | 12730 | 39838* |
| Core Split Power Ratio ($P_{High}/P_{Low}$) | 1.26 | 1.29 | 1.48 | 1.44 |
| Relative Improvement Propulsive Efficiency ($\eta_{propulsive}$) | 8.6% | 9.0% | 3.1% | Base (0%) |
| Thermal Efficiency ($\eta_{thermal}$) | 0.54 | 0.53 | 0.55 | 0.56 |
| Relative Improvement Thermal Efficiency ($\eta_{thermal}$) | −2.7% | −5.0% | −2.1% | Base (0%) |
| Overall Efficiency ($\eta_{overall}$) | 0.38 | 0.38 | 0.37 | 0.36 |
| Relative Improvement Overall Efficiency ($\eta_{overall}$) | 5.6% | 3.6% | 0.8% | Base (0%) |
| TSFC | 0.51 | 0.52 | 0.53 | 0.57 |
| Relative Improvement TSFC | −10.9% | −9.2% | −6.7% | Base (0%) |

*includes HP for a high pressure compressor and an intermediate pressure compressor Thus, as shown in Table 1, while comparison engine C has a core power ratio of 1.48, comparison engine C has a lower relative improvement in propulsive efficiency ($\eta_{propulsive}$) and overall efficiency ($\eta_{overall}$) than the exemplary gas turbine engines A and B. The exemplary gas turbine engines A and B also have more favorable relative improvements of TSFC than comparison engine C.

Similar benefits to the overall efficiency ($\eta_{overall}$) can be achieved by selecting an arrangement of the high pressure compressor 52 and low compressor 44 with respect to each other. The delta enthalpy rises across the high pressure compressor 52 and the low pressure compressor 44 can be expressed as:

$$(dh_{HPC}) = T_{2.5} \times c_p \times [(PR_{HPC}^{((\gamma-1)/(\eta_{polytropic} \times \gamma))}) - 1] \quad \text{Equation 11:}$$

$$(dh_{LPC}) = T_{2.0} \times c_p \times [(PR_{LPC}^{((\gamma-1)/(\eta_{polytropic} \times \gamma))}) - 1] \quad \text{Equation 12:}$$

where ($T_{2.5}$) is the temperature at the inlet of the high pressure compressor 52 in a two-spool architecture (or approximately $T_{2.2}$ in a three-spool arrangement, measured at the inlet to the intermediate pressure compressor 45), ($PR_{HPC}$) is the pressure ratio across the high pressure compressor 52 (and from the inlet of the intermediate pressure compressor 45 to the exit of the high pressure compressor 52 in a three-spool arrangement), ($T_{2.0}$) is the temperature at the inlet of the low pressure compressor 44 in a two-spool architecture (or approximately $T_1$ in a three-spool arrangement, measured at the inlet to fan 42), ($PR_{LPC}$) is the pressure ratio across the low pressure compressor 44 (or the pressure ratio across the fan 42 in a three-spool arrangement), ($\gamma$) is the ratio of ($c_p$) to ($c_v$), with ($c_p$) being the specific heat capacity measured for a constant pressure process in Btu per lbm per degree Rankine (° R), and being ($c_v$) is the specific heat capacity measured for a constant volume process in Btu per lbm per degree Rankine (° R). Temperatures ($T_{2.0}$), ($T_{2.2}$), and ($T_{2.5}$) are measured in degree Rankine (° R).

The core split power ratio ($P_{High}/P_{Low}$) can be approximated by a ratio of the delta enthalpy rises across the compressors as:

$$(P_{High}/P_{Low}) = (dh_{HPC})/(dh_{LPC}) \quad \text{Equation 13:}$$

where ($dh_{HPC}$) is the delta enthalpy rise across the high pressure compressor 52 measured as exit minus inlet per lb. of airflow through the high pressure compressor 52, and where ($dh_{LPC}$) is the delta enthalpy rise across the low pressure compressor 44 measured as exit minus inlet per lb. of airflow through the low pressure compressor 44. In some examples, engine 20 is designed to define a core split power ratio at a predetermined design target. In some examples, the predetermined design target is defined at sea level and at a static, full-rated takeoff power condition. In other examples, the predetermined design target is defined at a cruise condition.

With ratios of the delta enthalpy rises similar to the core split power ratios disclosed herein, a very efficient overall gas turbine engine is achieved. In the illustrated embodiment, the low pressure compressor 44 includes fewer stages than the high pressure compressor 52. In some embodiments, the low pressure compressor 44 includes 3 or more stages, or more narrowly 3 to 6 stages, such as 4 stages, and the high pressure compressor 52 includes 6 or more stages, or 15 or fewer stages. In some embodiments, the high pressure compressor 52 includes 7 to 15 stages, such as 8 stages. In the illustrated embodiment, the high pressure turbine 54 includes fewer stages than the low pressure turbine 46. In further embodiments, the turbine section 28 includes at least 2 turbine stages upstream of the fan drive turbine 46. In embodiments, the fan drive turbine 46 includes 3 or more stages, or 6 or fewer stages. In some embodiments, the fan drive turbine 46 includes between 3 and 6 stages, such as 5 stages (shown in FIG. 1).

The core split power ratios disclosed herein can be combined with one or more features to further improve the propulsive efficiency ($\eta_{propulsive}$) of the engine. As shown in FIG. 6, the turbine section 28, more particularly the low pressure turbine 46, for example, can include one or more turbine blades 29 with features permitting higher inlet temperatures, higher rotational speeds and gear reduction ratios than conventional turbines. The turbine blade 29 includes an airfoil 33 extending radially outward from a root 35. The blade 29 can include one or more cooling features 37 configured to receive coolant from a coolant source 43 (shown schematically) for cooling the blades 29, as is known in the art. In some embodiments, the coolant source 43 is the compressor section 24. The cooling features 37 can be one or more plenums and/or passages formed in the turbine blade 29 to provide impingement or convection cooling. In some embodiments, the cooling features 37 provide coolant to one or more cooling holes 39 for providing film cooling. Each turbine blade 29 can be made of a directionally solidified material (shown schematically in FIG. 6A) or a single-crystal material. Directionally solidified materials include a microstructure having a plurality of elongated grains 66 that are parallel to the major stress axes of the component as is known in the art. Each of the elongated grains 66 can extend the along the airfoil 33 between the root 35 and blade tip 51. Single crystal materials are formed as a single, homogenous crystal of material that includes no grain boundaries in the material, or rather, consist of only one grain. Single crystal materials can include nickel-based super alloys such as Nickel aluminide (NiAl). In further embodiments, the turbine section 28 includes at least two turbine stages upstream of the fan drive turbine 46. Modification of the low pressure turbine 46 with these features enables redistribution of horsepower from the high spool 32 to the low spool 30, which can further result in a reduction of the number of stage counts in the high pressure compressor 52 and a more compact engine arrangement.

In another embodiment, the fan section 22 includes a hardwall containment system 70 (shown schematically in FIG. 1) arranged about the engine axis A and spaced radially from the fan blades 42. The hardwall containment system 70 is configured to contain, and absorb the impact of, a fan blade 42 separating from a fan hub 41 (shown schematically in FIG. 1) or a fragment thereof. In some embodiments, the hardwall containment system 70 is a hard ballistic liner applied to the nacelle or fan case 15 as is known in the art. The hard ballistic liner can include a rigid material such as a resin impregnated fiber structure, metallic structures, or ceramic structures. However, other materials and structures of the hardwall containment system 70 are contemplated. In yet another embodiment, the fan section 22 includes a fan case 15 made of an organic matrix composite (shown schematically in FIG. 7). The organic matrix composite can include a matrix material 72 and reinforcement fibers 74 distributed through the matrix material 72. The reinforcement fibers 74 may be discontinuous or continuous, depending upon the desired properties of the organic matrix composite, for example. The matrix material 72 may be a thermoset polymer or a thermoplastic polymer. The reinforcement fibers 74 may include carbon graphite, silica glass, silicon carbide, or ceramic. Given this description, one of ordinary skill in the art will recognize that other types of matrix materials and reinforcement fibers may be used. In further embodiments, the fan section 22 includes a fan blade and a disk with a characteristic density of less than about 13.1 pounds per in^2 of frontal area with respect to the engine. In some embodiments, the fan section 22 has a fan blade efficiency greater than about 94.5%, being defined as the amount of thrust generated by the fan blade 42 compared to the work provided to the fan blade 42 by the gear reduction 48 or low speed spool 30. In further embodiments, the bypass ratio (BPR) which is defined as a volume of air passing to the bypass duct compared to a volume of air passing into the compressor section 24 is greater than about 12:1. In some embodiments, the bypass ratio is less than about thirty (30), or more narrowly less than about twenty (20).

The core power ratios disclosed herein can be combined with one or more features to further improve the thermal efficiency ($\eta_{thermal}$) of the engine, expressed below in quantities at a flight condition of 0.8 Mach and 35,000 feet. In some embodiments, the low pressure turbine 46 is configured to rotate at least about 2.6 times faster than the fan section 22 and preferably at least about 2.9 times faster than the fan section 22. In further embodiments, an overall pressure ratio (OPR) of the engine provided by a combination of the low pressure compressor 44 and the high pressure compressor 52 and the pressure rise at the root of the fan section 22 is equal to or greater than about 36. In another embodiment, the fan section 22 defines a fan pressure ratio less than about 1.50 and preferably less than about 1.40, the low pressure turbine 46 is configured to rotate at least about 2.6 times faster than the fan section 22 and preferably at least 2.9 times faster than the fan section 22, the overall pressure ratio is equal to or greater than about 36 corresponding to a predetermined design target, and the turbine section 28 includes at least two turbine stages upstream of the low pressure turbine 46. In other examples, an overall pressure ratio corresponding to the predetermined design target is greater than or equal to about 40:1, or greater than or equal to about 50:1. In examples, the overall pressure ratio corresponding to the predetermined design target is less than or equal to about 80:1, or more narrowly less than or equal to about 60:1.

In some embodiments, the fan section 22 has a fan blade efficiency greater than about 94.5%, the fan drive turbine 46 has a thermal efficiency greater than about 90.9%, and the low pressure compressor 44 has a thermal efficiency of at least about 87% and is configured to deliver air to the high pressure compressor 52 having a thermal efficiency of at least about 85.1%. With respect to the compressor section 24, thermal efficiency can be defined as the pressure rise versus the temperature rise between an inlet and an outlet of one of the low pressure and high pressure compressors 44, 52. Thermal efficiency with respect to the fan drive turbine 46 is defined as the pressure decrease between the inlet and the outlet as compared to the work transferred to the low speed spool 30. In further embodiments, the cooling air flow to the turbine section 28 is less than or equal to about 36% of the core airflow along the core airflow path C, which increases the amount of compressed air provided to the combustor section 26. In other embodiments, the gear arrangement 48 has a thermal efficiency at sea-level takeoff and at stationary conditions of greater than about 98.7% as measured by the oil temperature rise between an inlet and an outlet of the gear arrangement 48.

Engines made with the disclosed architecture, and including spool arrangements as set forth in this application, and with modifications coming from the scope of the claims in this application, thus provide very high efficient operation, have increased fuel efficiency, and are compact and lightweight relative to their thrust capability. Two-spool and three-spool direct drive engine architectures can also benefit from the teachings herein.

It should be understood that relative positional terms such as "forward," "aft," "upper," "lower," "above," "below," and the like are with reference to the normal operational attitude of the vehicle and should not be considered otherwise limiting.

While this invention has been disclosed with reference to one embodiment, it should be understood that certain modifications would come within the scope of this invention. For that reason, the following claims should be studied to determine the true scope and content of this invention.

What is claimed is:

1. A gas turbine engine comprising:
   a fan section including a plurality of fan blades;
   a compressor section, including at least a first compressor section and a second compressor section;
   a turbine section including at least one turbine to drive said second compressor section and a fan drive turbine to drive at least an epicyclic gear arrangement to drive said fan section and said first compressor section, said turbine section including at least two turbine stages upstream of said fan drive turbine; and
   wherein a power ratio is provided by the combination of said first compressor section and said second compressor section, with said power ratio being provided by a second power input to said second compressor section divided by a first power input to said first compressor section, said power ratio being equal to, or greater than, 1.0 and less than, or equal to, 1.4.

2. The gas turbine engine as set forth in claim 1, wherein said fan drive turbine includes six or fewer stages.

3. The gas turbine engine as set forth in claim 2, wherein said power ratio is less than 1.27.

4. The gas turbine engine as set forth in claim 2, wherein said fan section is configured to deliver a portion of air into said compressor section, and a portion of air into a bypass duct, and wherein a bypass ratio, which is defined as a volume of air passing to said bypass duct compared to a volume of air passing into said compressor section, is equal to or greater than 10.

13

5. The gas turbine engine as set forth in claim 2, wherein a gear ratio of said gear arrangement is greater than 2.6.

6. The gas turbine engine as set forth in claim 2, wherein an overall pressure ratio being provided by the combination of said first compressor section, said second compressor section and a fan root pressure rise of said fan section, said overall pressure ratio being equal to or greater than 36.

7. The gas turbine engine as set forth in claim 1, wherein said fan section defines a fan pressure ratio less than 1.50 across the fan blades alone, said first turbine section is configured to rotate at least 2.6 times faster than said fan section, and an overall pressure ratio being provided by the combination of said first compressor section, said second compressor section and a fan root pressure rise of said fan section, said overall pressure ratio being equal to or greater than 36.

8. The gas turbine engine as set forth in claim 1, wherein said first compressor section includes 3 or more stages and said second compressor section includes between 8 and 15 stages.

9. The gas turbine engine as recited in claim 8, wherein said fan drive turbine includes three 3 to six 6 stages.

10. The gas turbine engine as recited in claim 9, wherein said fan drive turbine defines a fan drive turbine pressure ratio that is greater than five.

11. The gas turbine engine as set forth in claim 7, wherein said power ratio is less than 1.27, said overall pressure ratio is equal to or greater than 50, and said gear arrangement is a planetary gear system.

12. A gas turbine engine comprising:
a fan section including a plurality of fan blades;
a compressor section, including at least a first compressor section and a second compressor section, said first compressor section including 3 or more stages and said second compressor section including 6 or more stages;
a turbine section including at least one turbine to drive said second compressor section and a fan drive turbine to drive at least a gear arrangement to drive said fan section, said turbine section including at least 2 turbine stages upstream of said fan drive turbine; and
wherein a power ratio is provided by the combination of said first compressor section and said second compressor section, with said power ratio being provided by a second power input to said second compressor section divided by a first power input to said first compressor section, said power ratio being equal to or greater than 1.0; and
wherein an overall pressure ratio is provided by the combination of said first compressor section, said second compressor section and a fan root pressure rise of said fan section, said overall pressure ratio being equal to, or greater than, 36.

13. The gas turbine engine as set forth in claim 12, wherein said fan section defines a fan pressure ratio less than 1.50 across the fan blades alone, a gear ratio of said gear arrangement is greater than 2.6, said turbine section includes at least 2 turbine stages upstream of said fan drive turbine, and said fan drive turbine includes 3 to 6 stages.

14. The gas turbine engine as set forth in claim 12, wherein said power ratio is between 1.0 and 1.4.

15. The gas turbine engine as set forth in claim 12, wherein said fan section defines a fan pressure ratio less than 1.45 across the fan blades alone.

16. The gas turbine engine as recited in claim 15, wherein said fan drive turbine defines a fan drive turbine pressure ratio that is greater than five (5).

14

17. The gas turbine engine as set forth in claim 16, wherein said power ratio is less than 1.27.

18. The gas turbine engine as recited in claim 17, wherein said fan section is configured to deliver a portion of air into said compressor section, and a portion of air into a bypass duct, and wherein a bypass ratio, which is defined as a volume of air passing to said bypass duct compared to a volume of air passing into said compressor section, is equal to or greater than 12.

19. The gas turbine engine as set forth in claim 13, wherein said gear arrangement is a planetary gear system, and said overall pressure ratio is equal to or greater than 60.

20. A gas turbine engine comprising:
a fan section;
a compressor section, including at least a first compressor section and a second compressor section;
a turbine section including at least one turbine to drive said second compressor section and a fan drive turbine to drive at least a gear arrangement to drive said fan section;
wherein a power ratio is provided by the combination of said first compressor section and said second compressor section, with said power ratio being provided by a second power input to said second compressor section divided by a first power input to said first compressor section, said power ratio being equal to or less than 1.4; and
wherein an overall pressure ratio is provided by the combination of said first compressor section, said second compressor section and a fan root pressure rise of said fan section, said overall pressure ratio being equal to or greater than 36.

21. The gas turbine engine as set forth in claim 20, wherein said first compressor section includes 3 or more stages, said second compressor section includes 6 or more stages, said turbine section includes at least 2 turbine stages upstream of said fan drive turbine, and said fan drive turbine includes three 3 to six 6 stages.

22. The gas turbine engine as set forth in claim 20, wherein said power ratio is greater than or equal to 1.0.

23. The gas turbine engine as set forth in claim 20, wherein said fan section is configured to deliver a portion of air into said compressor section, and a portion of air into a bypass duct, and wherein a bypass ratio, which is defined as a volume of air passing to said bypass duct compared to a volume of air passing into said compressor section, is equal to or greater than 10.

24. The gas turbine engine as set forth in claim 20, wherein said overall pressure ratio is equal to or greater than 60.

25. A method of designing a gas turbine engine comprising:
providing a fan section;
providing a compressor section, including a first compressor section and a second compressor section;
providing a turbine section including at least one turbine to drive said second compressor section and a fan drive turbine to drive said fan section via a gear arrangement;
wherein a power ratio is provided by the combination of said first compressor section and said second compressor section, with said power ratio being provided by a second power input to said second compressor section divided by a first power input to said first compressor section, said power ratio is equal to or less than 1.4 at a predetermined design target; and
wherein an overall pressure ratio is provided by the combination of said first compressor section, said second compressor section and a fan root pressure rise of said fan section, said overall pressure ratio being equal to or greater than 36 at the predetermined design target.

26. The method as set forth in claim 25, wherein said predetermined design target is defined at sea level and at a static, full-rated takeoff power condition.

27. The method as set forth in claim 25, wherein said predetermined design target is defined at a cruise condition.

28. The method as set forth in claim 25, wherein said power ratio is greater than or equal to 1.0.

29. The method as set forth in claim 25, wherein said first compressor section includes 3 or more stages, said second compressor section includes 6 or more stages, said second compressor section is positioned downstream of said first compressor section, said fan drive turbine includes three 3 to six 6 stages, and said at least one turbine includes fewer stages than said fan drive turbine.

30. The method as set forth in claim 29, wherein said power ratio is less than 1.27, and said overall pressure ratio is equal to or greater than 60.

* * * * *